Jan. 31, 1939. E. MORELLI 2,145,365
REFLECTING APPARATUS FOR THE OBSERVATION OF
RADIOGRAPHIC DIASCOPIC IMAGES
Filed April 4, 1938 2 Sheets-Sheet 1
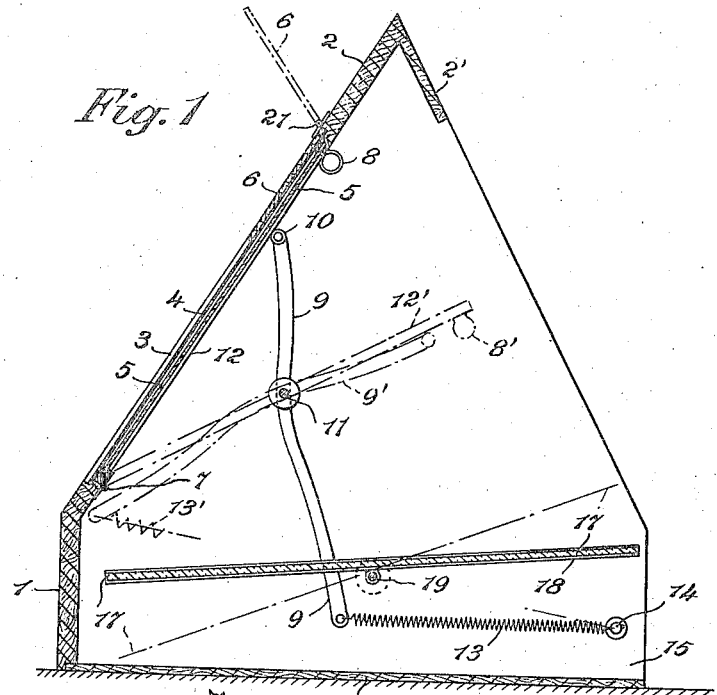
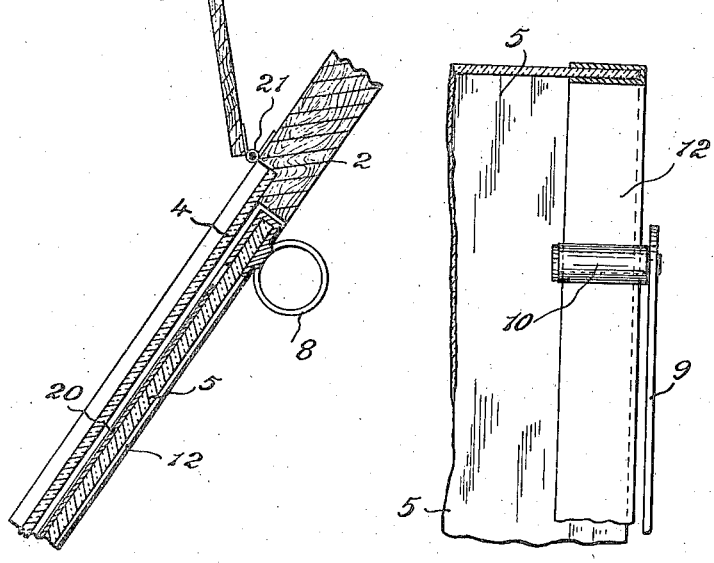
E. Morelli
INVENTOR
By: Glascock Downing Seebold
Attys.

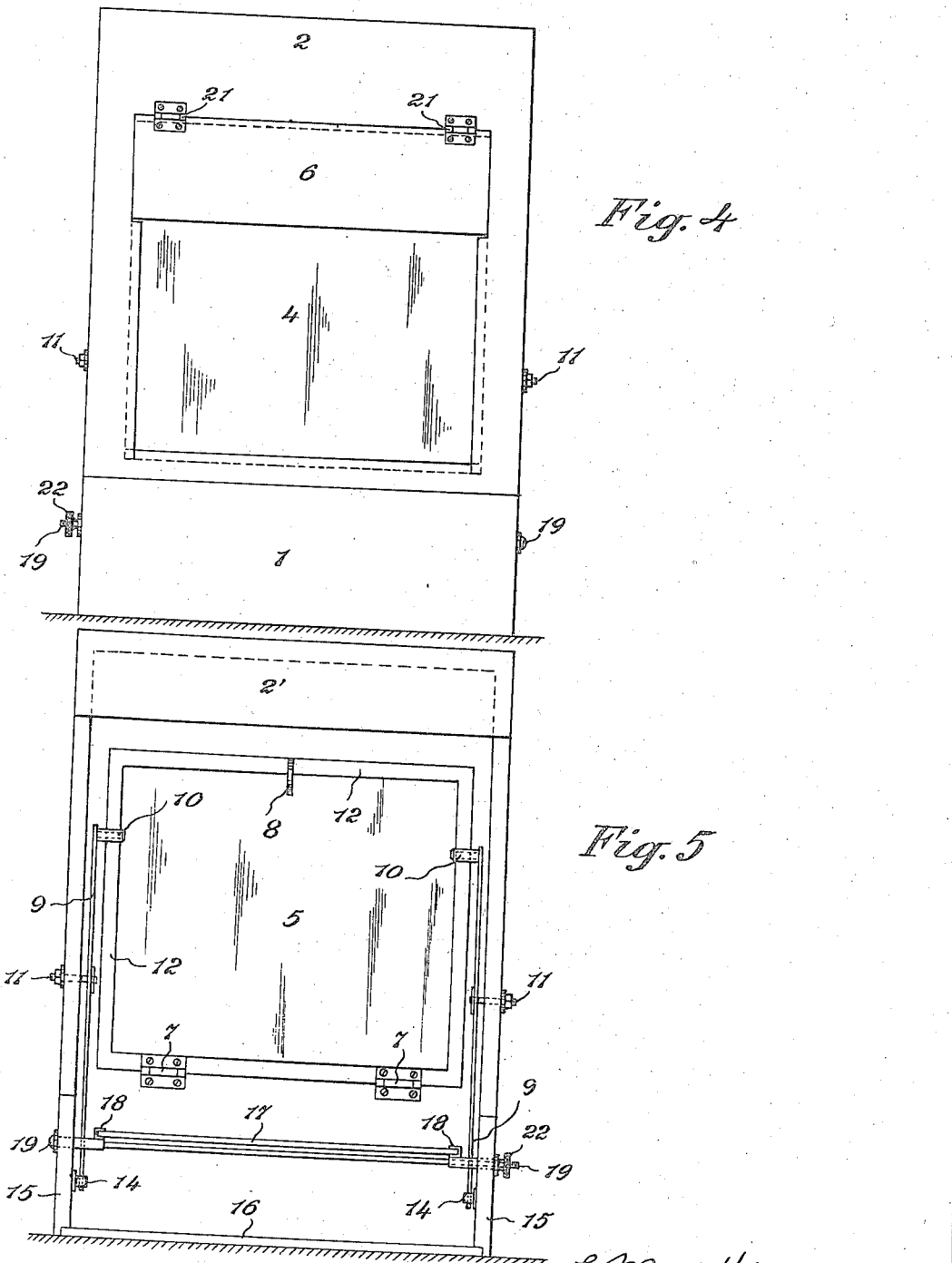

Patented Jan. 31, 1939

2,145,365

UNITED STATES PATENT OFFICE 2,145,365

REFLECTING APPARATUS FOR THE OBSERVATION OF RADIOGRAPHIC DIASCOPIC IMAGES

Eugenio Morelli, Rome, Italy

Application April 4, 1938, Serial No. 200,037
In Italy December 30, 1937

5 Claims. (Cl. 40—152)

The present invention relates to a reflecting apparatus for the observation of radiographic diascopic images.

The apparatus subject matter of invention comprises a box formed by two substantially triangular side walls, an inclined front wall with a window for illuminating the diapositive or radiographic diapositive picture, and an inclined back wall with a window for observing the diascopic image reflected by a movable mirror swiveljointed to the bottom part of the box.

According to the invention apparatus of the type mentioned is provided with means for applying and taking off the support of the image to be observed, respectively for applying or removing the radiographic discopic image without the necessity of a change of position for the operator, who once placed behind the apparatus is allowed to substitute the images one for the other quickly and comfortably without executing movements which may render the work difficult.

The advantages of the present invention are desirable because according to the known devices of this type no simple, practical and economical means had been offered for effecting the observation of diascopic images (fotograms, radiographic images and the like) without the help of a second operator and without a great loss of time for the single operator.

According to the present invention the radiographic or other diascopic image is arranged on a transparent support hinged at the bottom within the observation box, said support being biased by elastic means in such a way as to have in each position a slight tendency to ascend again into the observation position, that is leaning against the window provided in the front wall of the apparatus. In order to obtain a substantial uniformity of tension in ascending again to the observation position for said transparent support hinged to the bottom, said elastic means comprises a system of springs acting on said transparent support by means of a system of levers varying the actuating arm of the forces developed by said springs, so that a constant or substantially constant moment of rotation is obtained on said transparent, hinged support. More exactly the system of said springs and levers exercises such tension on said transparent support, that after considering the different action of gravity in the different positions taken by said support, the resulting moment tending to return the support back to the position of observation is constant for each of said positions.

According to the present invention the mirror for reflecting the image to be observed is mounted so as to swing with its middle part on an axis the rotation of which may be blocked in any position whatever by means of a hand control.

The invention will now be described with reference to the accompanying drawings, in which:

Figure 1 illustrates the apparatus in a symmetrical vertical section;

Figures 2 and 3 show two details of the apparatus according to Fig. 1;

Figures 4 and 5 are respectively a front and back elevation of the apparatus according to Fig. 1.

The apparatus subject matter of the present invention comprises a box 1 provided with an inclined front wall 2 and an inclined back wall 2'. In the front wall is a window 3 closed by a transparent fixed plate 4, preferably of glass. Behind this fixed plate 4 there is arranged a moveable transparent plate 5 hinged to the bottom at 7. A moveable, opaque flap 6 is hinged at 21 at the front and upper part of the window 3 with the object of limiting at will the luminous field of the window 3. A ring 8 is applied to the frame 12 of the transparent moveable plate 5 so that this plate may be operated. The moveable plate 5 leans with its frame 12 on small rollers 10 arranged on levers 9 fulcrumed at 11 and biased by tension springs 13 fixed at 14 to the side walls 15 of the box 1. The box is closed below by a bottom 16 and between the bottom and the swinging mirror 17 there is a substantial parallelopipedic horizontal space capable of containing a certain number of radiographic films or other diascopies to be observed by means of the apparatus.

The mirror 17 is provided with a frame 18 and is fixed on a shaft 19 which may be locked in any position by means of the nut 22.

The diascopic, radiographic film 20 is arranged in contact with the transparent movable plate 5 and then brought by the latter against the fixed transparent plate 4 under the action of the springs 13, as particularly illustrated in Fig. 2.

The invention has been disclosed and illustrated in a preferred modification but it is understood that constructive changes may be introduced without surpassing the limits of protection of the patent.

Having now particularly described and pointed out the nature of my said invention and in what manner the same is to be performed, I declare that what I claim is:

1. Reflecting apparatus of the type described comprising a box including spaced upright side walls of substantially triangular configuration, a bottom connecting the lower edges of the side walls, front and rear walls respectively connected to the inclined edges of the side walls, the front wall having a window therein, diascopic supporting means movably mounted adjacent the window in said front wall, the rear wall having an observation window therein, a movable mirror swingably mounted adjacent the bottom of the said box, whereby the diascopic image in the supporting means is reflected in such a manner as to be observed through the said observation window.

2. Apparatus according to claim 1, in which the supporting means comprises a movable transparent plate hingedly mounted adjacent the front window in said box, and elastic means operatively connected therewith for normally holding the said supporting means in a position of observation.

3. Apparatus according to claim 1, in which an opaque flap is provided in the front wall of the box for limiting the size of the opening therein.

4. Apparatus according to claim 1, in which a base plate is provided for the mirror, a shaft to which the plate is fixed, and hand control means on said shaft for locking the shaft and mirror in any desired angular position.

5. Apparatus according to claim 1, in which the mirror when in a horizontal position is spaced from the bottom of the box sufficiently to form a storage chamber for diascopic films.

EUGENIO MORELLI.